March 18, 1924.
R. E. HELLMUND
ELECTRICAL SYSTEM
Filed June 18, 1919 2 Sheets-Sheet 2
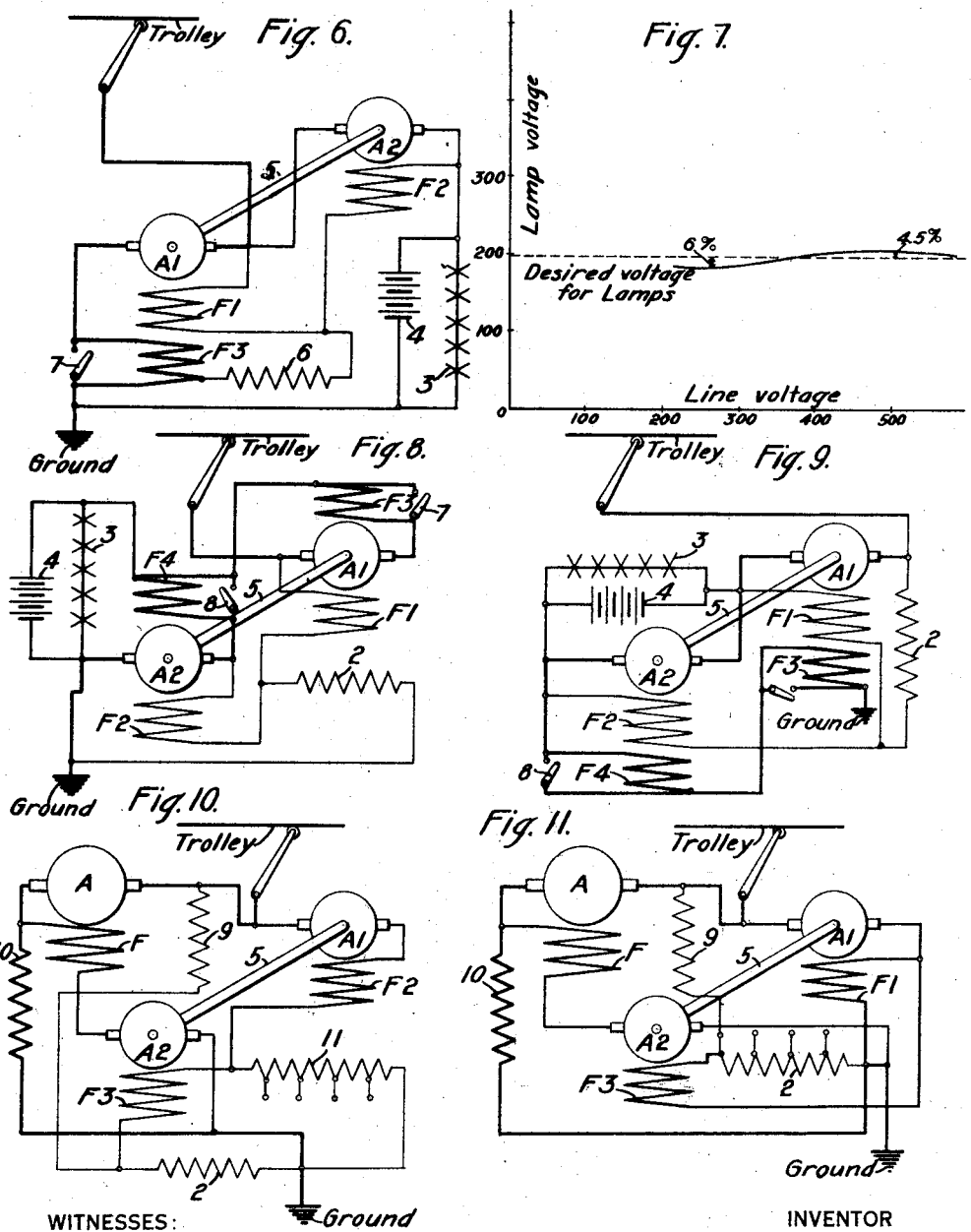
WITNESSES:
INVENTOR
Rudolf E. Hellmund
BY
ATTORNEY Patented Mar. 18, 1924.

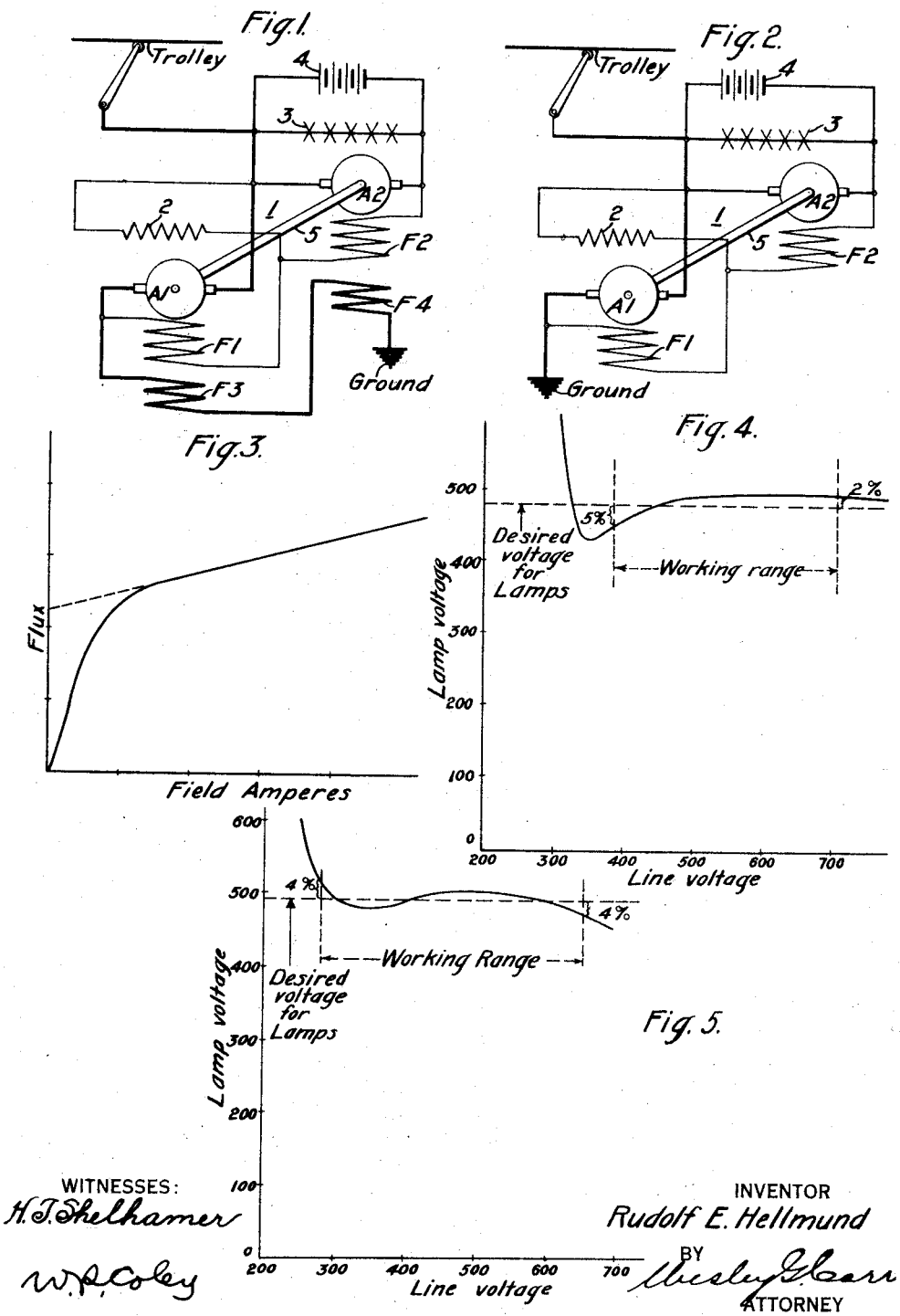

1,486,890

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed June 18, 1919. Serial No. 305,106.

*To all whom it may concern:*

Be it known that I, RUDOLF E. HELLMUND, a citizen of the German Empire, and a resident of Pittsburgh, in the county of Allegheny and State of Pennsylvania, have invented a new and useful Improvement in Electrical Systems, of which the following is a specification.

My invention relates to electrical systems and particularly to train-lighting systems, or the like, where a substantially constant delivered voltage is desired.

One object of my invention is to provide a system of the above-indicated character which shall be relatively quick-acting to compensate for the unavoidable fluctuations of trolley voltage, whereby a minimum degree of flicker of the car lamps occurs.

More specifically stated, it is the object of my invention to provide a motor-generator set, together with counter-voltage-producing means, such as an impedance, that is connected in circuit to receive certain combinations of the currents traversing the field windings of the motor-generator set, whereby the desired result of producing a substantially constant voltage for the car lamps is secured.

Other objects of my invention will become evident from the following detailed description taken in conjunction with the accompanying drawings, wherein Figure 1 is a diagrammatic view of an electrical system organized in accordance with the present invention;

Figs. 2, 6 and 8 to 11, inclusive, are diagrammatic views of modified forms of the invention, and Figs. 3, 4, 5 and 7 are curve charts serving to indicate various operating conditions of the illustrated systems.

Referring to Fig. 1 of the drawings, the system here shown comprises supply-circuit conductors Trolley and Ground; a motor-generator set 1; a resistor 2 or other counter-voltage-producing means; a load circuit 3, such as a plurality of car lamps; and a storage battery 4 that is connected across the load for the purpose of further steadying the voltage applied thereto, in accordance with a familiar practice.

The motor-generator set 1 comprises a motor armature winding A1 and a generator armature winding A2 that are mechanically associated, as by a shaft 5, together with a plurality of shunt field windings F1 and F2 and series field windings F3 and F4 for the respective armature windings A1 and A2.

The motor armature winding A1 is connected through the field windings F3 and F4 across the supply-circuit, while the generator armature winding A2 is directly connected to the set of lamps 3 and the storage battery 4. The field windings F2 and F1 are jointly connected between the lower-voltage terminals of the respective armature windings, and the resistor 2 is connected from a point intermediate the armature windings A1 and A2 to a point intermediate the shunt field windings F1 and F2.

The system shown in Fig. 2 omits the series field windings F3 and F4, but is otherwise identical with the system of Fig. 1. The relative results of these two systems will be discussed below.

It is frequently the case that the voltage upon interurban cars is so variable, because of the severe voltage fluctuations or drops in the supply circuit, that satisfactory lighting effects cannot be obtained by connecting the lamps directly to the line. One method of obtaining a substantially constant voltage for the lamps is to install a motor-generator set including a shunt motor having an unsaturated field magnetic circuit. Such a motor, if maintained unsaturated over the entire voltage range of the supply circuit and if having relatively low ohmic resistance, would possess approximately constant-speed characteristics, so that a shunt-excited generator driven thereby would provide a substantially constant voltage for the car lamps. However, a motor fulfilling the above conditions would be relatively large and expensive and is out of the question for the majority of interurban lines. The present systems, therefore, have been devised to compensate for the above-mentioned fluctuations of supply-circuit voltage without requiring an unduly expensive motor-generator set.

Considering Fig. 2, for example, the resistor 2, when connected as described above, carries the sum of the currents traversing the motor field winding F1 and the generator field winding F2. Assuming that $e_1$ = the motor voltage, $e_2$ = the generator voltage,
$a$ = the resistance of the motor field winding F1,
$b$ = the resistance of the generator field winding F2,
$c$ = the resistance of the resistor 2,
$x$ = the current in the motor field winding F1, and
$y$ = the current in the generator field winding F2, the following equations (1) and (2) represent the values of the voltages $e_1$ and $e_2$, expressed as functions of the currents $x$ and $y$ in the field windings:

(1) $e_1 = xa + (x+y)c$
(2) $e_2 = yb + (x+y)c$

Multiplying out, equations (3) and (4) are obtained (3) $e_1 = xa + xc + yc$
(4) $e_2 = yb + xc + yc$ Equations (5) and (6) are obtained by regrouping, (5) $e_1 = x(a+c) + yc$
(6) $e_2 = xc + y(b+c)$ and equations (7) and (8) by multiplying equation (5) by the factor $c$ and equation (6) by the binomial $(a+c)$.

(7) $e_1 c = x(a+c)c + yc^2$
(8) $e_2(a+c) = x(a+c)c + y(b+c)(a+c)$

Transposing and solving for $y$, equations (9) and (10) are obtained (9) $e_1 c - e_2(a+c) = yc^2 - yab - ybc - yac - yc^2$.

$$(10) \quad y = \frac{e_2(a+c) - e_1 c}{ab + bc + ac}$$

In a similar manner, the value of $x$ as set forth in equation (11) may be secured $$(11) \quad x = \frac{e_2 - y(b+c)}{c}$$

Consequently, by choosing proper values of the resistances $a$, $b$ and $c$, it will be seen that it is possible to cause the speed of the motor to decrease upon an increase of line voltage and to simultaneously augment the strength of the generator field winding F2, so that the delivered voltage $e_2$ of the generator armature remains substantially constant over a wide range.

Fig. 3 shows the magnetic-saturation curve applying to the two machines, when connected as shown in Fig. 1 or Fig. 2, the curve being plotted with field amperes as abscissæ and flux values as ordinates.

Fig. 4 shows the voltage curve of the generator armature winding or, in other words, the lamp voltage is plotted against the line voltage. It will be noted that the line voltage may be varied through a working range from 380 to 700 volts, approximately, without causing a generated voltage variation of more than 5% from the average desired voltage for the lamps. The legends placed upon Fig. 4 will obviate the necessity of any further explanation thereof.

Considering Fig. 1, which, as previously stated, adds the series field windings F3 and F4 to the system of Fig. 2, whereby the liability to "flashover" conditions in the motor-generator set is greatly reduced, such a system will properly compensate for still greater variations of supply-circuit voltage, and should be employed where the voltage regulation of the trolley circuit is still poorer than that assumed in connection with the system of Fig. 2 and the curve chart, Fig. 4.

The lamp voltage is again plotted against the line voltage in Fig. 5, and it will be noted that a variation of not more than 4% from the average desired lighting voltage is provided by the generator armature A2 over a working range from 280 to 650 volts, approximately.

It will be appreciated, without further illustration or description, that, if desired, the generator armature winding A2 may be designed of sufficient capacity to provide the necessary excitation for the field windings of a main car-propelling motor during the regenerative period thereof, in addition to supplying the desired substantially constant voltage to the lighting circuits.

Referring to Fig. 6, the system shown comprises the mechanically-connected motor-armature winding A1 and the generator-armature winding A2, together with the field windings F2 and F1, which are jointly connected between the lower-voltage terminal of the generator armature A2 and the higher-voltage terminal of the motor armature A1, and a resistor 6 which is connected in common series relation with the field windings F1 and F2. A series field winding F3 is provided for the motor-armature winding A1 and may be short-circuited by a switch 7 to eliminate the effect thereof whenever desired.

Instead of using a motor-generator set for furnishing the entire power to the load or lamp circuit, the connections of Fig. 6 may be employed, the switch 7 being considered as closed, whereby the supply-circuit voltage is impressed upon the motor-armature winding A1, and the generator-armature winding A2 adds or subtracts a certain voltage to or from the supply-circuit voltage to provide the desired electromotive force for the lamps 3. In the present case, the motor field winding F1 is augmented in strength upon an increase of line voltage, whereby the speed of the motor-generator set is reduced.

At the same time, the generator field winding F2 decreases in strength and, consequently, the voltage of the generator armature A2 is materially reduced in such proportion that the sum of the voltages of the motor and the generator armatures is kept substantially constant. As stated above, one advantage of the present arrangement over those previously described is that the energy that is furnished by the motor-generator set to the lamp circuit constitutes a relatively small percentage of the total energy required by the load.

It may be demonstrated mathematically, in a manner similar to that set forth in connection with Fig. 2, that the lamp voltage may be maintained practically constant over a relatively wide range of variation of the supply-circuit voltage. However, it is believed that the curve shown in Fig. 7 will be sufficient for the purposes of the present specification without requiring such a mathematical proof. It will be noted that the lamp-voltage curve varies not more than 6% over a line-voltage range between 250 and 600 volts.

Assuming now that the switch 7 is opened to insert the field winding F3 in circuit, it will be observed that, since a substantially constant lighting load is provided, the current taken by the motor-generator set from the supply circuit increases with a decrease in line voltage. Consequently, the total field flux of the motor increases more rapidly upon a reduction of supply-circuit voltage than in the case when the series field winding F3 is inoperative, as compared with the change of field flux of the generator. As a result, the operation of the motor-generator set may be rendered more sensitive, to provide a more nearly constant delivered voltage to the lighting load, when the series field winding F3 is utilized.

Whenever the storage battery 4 is floated across the load circuit, as illustrated, other systems of connections that are inherently not quite as satisfactory as those previously described may be employed, if regulation by the battery is depended upon to a material degree. Referring to Fig. 8, for example, the system shown comprises the armature windings A1 and A2, which are connected in series relation with the field windings F3 and F4 across the supply circuit, while the other field windings F1 and F2 are jointly connected between the higher-voltage terminals of the respective armature windings. The resistor 2 is again connected in common series relation with the field windings F1 and F2, and suitable switches 7 and 8 are provided for short-circuiting the field windings F3 and F4 to eliminate the effect thereof whenever desired.

The system just set forth has the advantage over the previous figures that each of the two machines may be made of smaller current-carrying capacity by reason of the series connection thereof. This arrangement is specially desirable in the case of high-voltage systems, such as 1200 volts, for instance, since the use of two 600-volt machines connected in series relation is permitted.

Assuming that the switches 7 and 8 are first closed to eliminate the effects of the series-field windings F3 and F4 and that the line voltage decreases, then the current in the generator field winding F2 and in the resistor 2 will correspondingly diminish. Upon a reduction in the current traversing the resistor 2, while the voltage of the motor armature winding A1 is maintained substantially constant by reason of the illustrated relative connections of the battery and the motor-generator set, it follows that, since a smaller voltage drop occurs in the resistor 2, a larger voltage than normal will be impressed upon the motor field winding F1 to increase the current flow therethrough. Such increase in field current compensates partially or entirely for the decreased speed of the motor-generator set that is caused by the above-mentioned drop in line voltage.

Whenever the switches 7 and 8 are opened, the series field windings F3 and F4 become active to render the operation of the system more sensitive and to provide closer voltage regulation, as mentioned above in connection with Fig. 6.

Referring to Fig. 9, the system shown again comprises the armature windings A1 and A2, which are connected in series relation with the field windings F4 and F3 across the supply circuit, while the remaining field windings F1 and F2 are jointly connected between the lower-voltage terminals of the respective armature windings. The short-circuiting switches 7 and 8 for the series-field windings F3 and F4 are again provided, while the resistor 2 is connected across a circuit including the motor-armature winding A1 and its field winding F1.

The connection of the resistor 2 is such as to cause it to carry the sum of the currents traversing the two field windings F1 and F2. Assuming that the line voltage drops, the current in the resistor 2 and the voltage drop thereacross will likewise decrease. Consequently, a greater percentage of reduction of voltage occurs in the motor-field winding F1 than in the generator-field winding F2. In other words, the strength of the field winding F1 is decreased to a greater degree than the strength of the field winding F2, which action, therefore, tends to maintain the voltage of the generator-armature winding A2. Such action may be mathematically demonstrated at length, but it is not believed that such demonstration is necessary here. If desired, the switches 7 and 8 may be opened to insert the series field windings F3 and F4 in circuit for the above-mentioned purposes.

Instead of the connections shown in Fig. 9, if desired, the series field windings F3 and F4 may be excited by current from the generator armature A2 or by the load current traversing the lamps 3. Furthermore, if desired, the field windings F3 and F4 may be connected to be energized from the substantially constant voltage that is delivered by the generator armature A2.

Fig. 10 and Fig. 11 illustrate the application of the principles of the present invention to regenerative control. In Fig. 10, the system shown comprises the supply-circuit conductors Trolley and Ground, across which a regenerating armature A of the main car-propelling motor is connected in seres relation with a stabilizing resistor 10. The auxiliary generator armature A2 is connected to energize the field winding F of the main machine through the resistor 10, while the auxiliary motor armature A1 is connected through a field winding F2 therefor and a variable resistor 11 across the supply circuit. A field winding F3 for the generator armature A2 is connected, through the resistor 2, across the resistor 11, and another resistor 9 is connected, in series relation with the resistor 2, across the supply circuit.

The resistor 2 thus carries the current traversing the generator field winding F3 as well as the current flowing through the resistor 9. Consequently, if the line voltage drops, the current in the resistors 9 and 2 correspondingly decreases. This action results in an increased voltage drop across the generator field winding F3 because of the connection thereof in parallel relation to the resistor 11, whereby an increased field excitation for the generator armature A2 is provided to counterbalance the decrease in supply-circuit voltage. In this way, a desirably constant voltage is suppled by the generator armature A2 to the field-winding circuit for the main regenerating machine.

Referring to Fig. 11, similar results are obtained by connecting the field windings F1 and F3 for the auxiliary motor and auxiliary generator, respectively, in parallel relation and in circuit with the resistor 2. One auxiliary circuit is thus established through the motor armature A1 and the field winding F1 to ground, while a branch circuit is completed from the lower-voltage terminal of the motor armature A1 through the generator-field winding F3 and the resistor 2 to ground. The resistors 9 and 2 are again connected in series relation across the supply circuit.

Since the operation of the system shown in Fig. 11 is analogous to that described in connection with Fig. 10 no further exposition thereof is deemed necessary.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a motor armature winding and a generator armature winding driven thereby, of a plurality of field windings for exciting said armature windings, and counter-voltage-producing means connected to receive certain combinations of the currents traversing said field windings.

2. In an electrical system for the generation of a substantially constant voltage, the combination with a motor-generator set, of counter-voltage-producing means connected to receive certain combinations of exciting currents for said motor-generator set.

3. In an electrical system for the generation of a substantially constant voltage, the combination with a motor-generator set embodying a plurality of exciting field windings, and a resistor connected in circuit with said field windings to receive a combination of the currents thereof.

4. The combination with a motor armature winding and a generator armature winding driven thereby, of a plurality of shunt field windings for exciting said armature windings, and a resistor connected in circuit with said field windings to receive a combination of the currents thereof.

5. The combination with a motor armature winding and a generator armature winding driven thereby, of a field winding for exciting the generator armature winding, and counter-voltage-producing means connected in circuit with said field winding to receive a combination of the field-winding current and a current dependent upon the voltage of said motor armature winding.

6. The combination with a motor armature winding and a generator armature winding driven thereby, of a field winding for exciting the generator armature winding, and counter-voltage-producing means connected in series relation with said field winding to receive the sum of the field-winding current and a current dependent upon the impressed voltage of said motor armature winding.

7. The combination with a supply circuit and a motor-generator set driven therefrom and comprising a field winding for the generator, of a resistor connected in series relation with said field winding to receive the sum of the field-winding current and a current dependent upon the voltage of said supply circuit.

8. The combination with a motor armature winding and a generator armature winding driven thereby, of a plurality of field windings jointly connected across the lower-voltage terminals of the respective armature windings, counter-voltage-producing means connecting a point intermediate the armature windings to a point intermediate the field windings, and a plurality of other field windings for the respective armature windings connected in series relation with the motor armature winding.

9. The combination with a motor armature winding and a generator armature winding driven thereby, of a plurality of field windings jointly connected across the lower-voltage terminals of the respective armature windings, and a resistor connecting a point intermediate the armature windings to a point intermediate the field windings.

In testimony whereof, I have hereunto subscribed my name this 6th day of June 1919.

RUDOLF E. HELLMUND.